(12) United States Patent
Yasunaga et al.

(10) Patent No.: US 7,070,747 B2
(45) Date of Patent: Jul. 4, 2006

(54) PROCESS OF ELUTING AND RECOVERING PHOSPHORUS FROM SLUDGE

(75) Inventors: Nozomu Yasunaga, Tokyo (JP); Seiji Furukawa, Tokyo (JP); Junji Hirotsuji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 221 days.

(21) Appl. No.: 10/449,118

(22) Filed: Jun. 2, 2003

(65) Prior Publication Data

US 2004/0241074 A1 Dec. 2, 2004

(51) Int. Cl.
| | |
|---|---|
| C01B 25/02 | (2006.01) |
| C01B 25/45 | (2006.01) |
| C01B 25/32 | (2006.01) |
| C01B 25/36 | (2006.01) |
| C01B 25/18 | (2006.01) |
| C02F 1/78 | (2006.01) |

(52) U.S. Cl. ............... 423/299; 210/723; 210/760; 210/764; 423/306; 423/308; 423/311; 423/317

(58) Field of Classification Search ............... 423/299, 423/317, 306, 308, 311; 210/723, 760, 764
See application file for complete search history.

(56) References Cited

U.S. PATENT DOCUMENTS

| 4,214,887 A | * | 7/1980 | van Gelder | ............... 71/9 |
| 6,106,717 A | | 8/2000 | Hasegawa et al. | |
| 6,623,650 B1 | * | 9/2003 | Millard | ............... 210/764 |
| 2004/0154988 A1 | * | 8/2004 | Sheets | ............... 210/718 |

FOREIGN PATENT DOCUMENTS

| EP | 0283153 | * | 9/1988 |
| JP | 8024872 | | 1/1996 |
| JP | 8039096 | | 2/1996 |
| JP | 9094600 | | 4/1997 |
| JP | 9108690 | | 4/1997 |
| JP | 2000000592 | | 1/2000 |

OTHER PUBLICATIONS

Otake et al.; Research on phosphorus recovery/recycle system from sewage water:, Proceedings of 37th Annual Conference, Japan Sewage Works Association, pp. 530-532 (2000), no month.

Jardin et al.; "Refixation of Phosphates Released During Bio-P Sludge Handling as Struvite or Aluminium Phosphate", Environmental Technology, vol. 22, pp. 1253-1262 (2001), no month.

* cited by examiner

Primary Examiner—Wayne A. Langel
(74) Attorney, Agent, or Firm—Leydig, Voit & Mayer, Ltd.

(57) ABSTRACT

In a process of eluting phosphorus from sludge into a liquid phase and recovering the phosphorus efficiently, cell walls of microorganisms in the sludge are ruptured by a process selected from crushing sludge (for example, treating with an ultrasonic wave homogenizer), treating with ozone, and treating with heat. Then the liquid phase is treated with alkali, thereby eluting the phosphorus into a liquid phase efficiently in a short time. By coagulating and precipitating, the phosphorus eluted into the liquid phase is recovered.

3 Claims, 9 Drawing Sheets

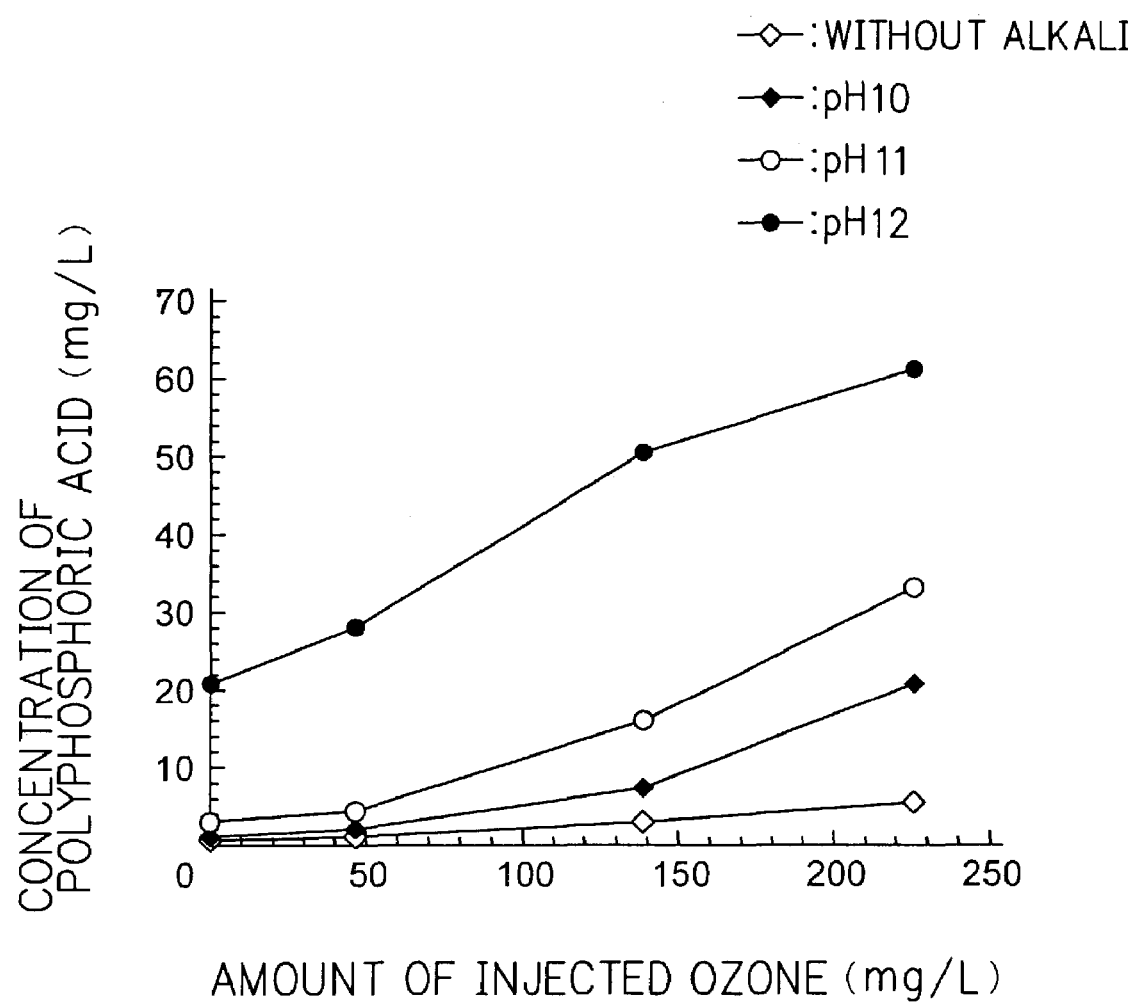

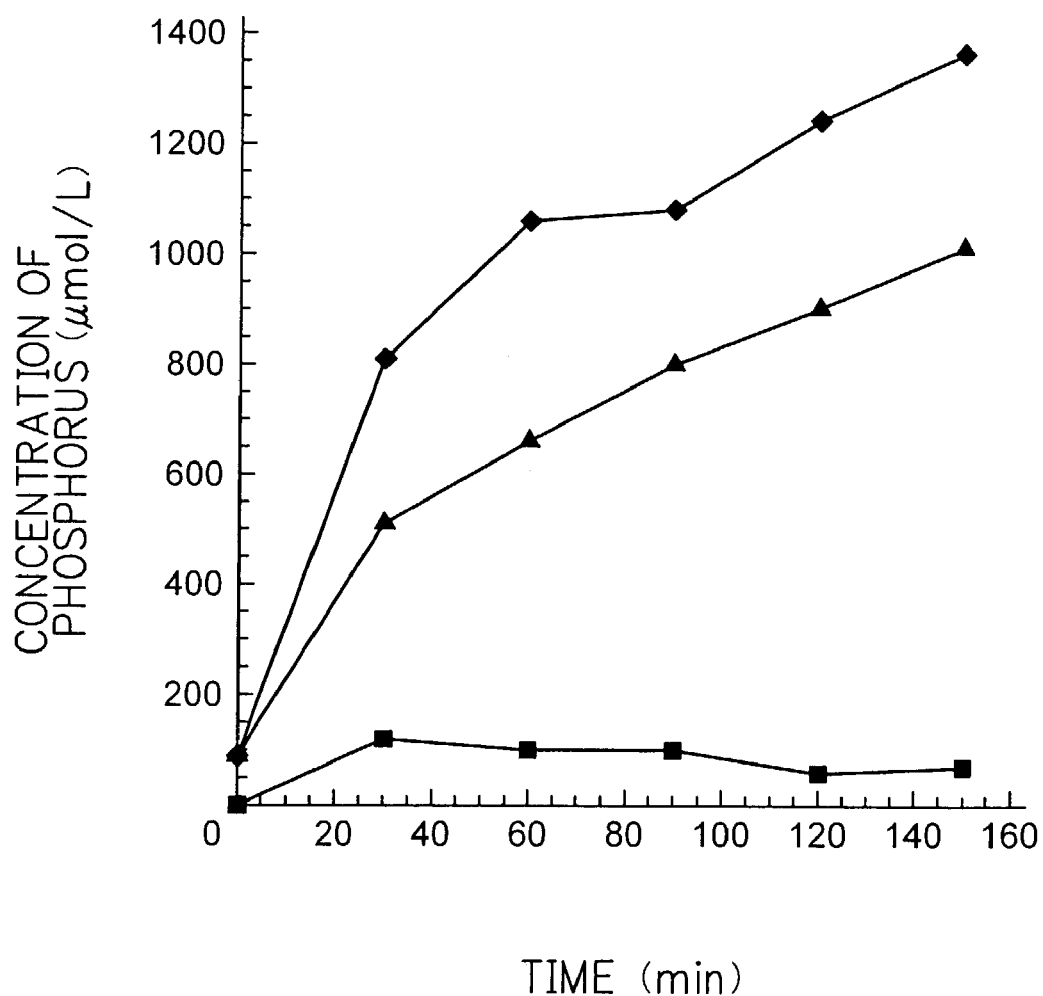

PROCESS OF ELUTING AND RECOVERING PHOSPHORUS FROM SLUDGE

FIELD OF THE INVENTION

The present invention relates to a process of eluting phosphorus efficiently from sludge into a liquid phase and a process of recovering the phosphorus.

BACKGROUND OF THE INVENTION

As a technique of recycling organic waste materials into resources, an attempt has been made to recover phosphorus from activated sludge and put it into resources. For example, in "Digest relating to development and research of recycling systems of organic waste materials into resources for a recycling society (2001)", a process, wherein activated sludge produced in sewage disposal is treated with heat and then phosphorus is eluted from activated sludge into a liquid phase, is mentioned. In the foregoing digest, as "Recovering of extricated phosphorus by utilizing thermophilic bacteria", a result of eluting phosphorus from activated sludge into a liquid phase only by treating activated sludge actually utilized in a sewage disposal with heat at 70° C. for 150 minutes, is mentioned (FIG. 9). FIG. 9 shows that as heat treating time becomes longer, the sum of the concentration of total phosphorus in a liquid phase and the concentration of orthophosphoric acid increase steadily, but the concentration of polyphosphoric acid hardly does.

As a result, in a process of only treating with heat, while it takes a very long time of 150 minutes, to elute phosphorus from activated sludge into a liquid phase, the recovery rate of phosphorus is as low as 50%. Also, efficient recovery of phosphorus from a liquid phase cannot be made because the amount of eluted polyphosphoric acid, which coagulates and is recovered more easily than orthophosphoric, is very small.

The object of the present invention is to solve the foregoing problem and to provide a process of eluting phosphorus from sludge into a liquid phase efficiently in a shorter time.

Another object of the present invention is to provide a process of recovering phosphorus after eluting phosphorus from sludge into a liquid phase.

SUMMARY OF THE INVENTION

Intensive studies have been conducted for the technique of recovering phosphorus out of sludge to complete the invention as follows.

The present invention relates to a process of eluting phosphorus out of sludge, which comprises crushing cell walls of microorganisms in sludge and then treating the resultant sludge with alkali, thereby eluting phosphorus out of sludge into a liquid phase.

The present invention relates to a process of eluting phosphorus out of sludge, which comprises crushing cell walls of microorganisms in sludge by crushing the sludge and then treating the resultant sludge with alkali, thereby eluting phosphorus out of sludge into a liquid phase.

The present invention relates to a process of eluting phosphorus out of sludge, which comprises crushing cell walls of microorganisms in sludge by treating the sludge with ozone and then treating the resultant sludge with alkali, thereby eluting phosphorus out of sludge into a liquid phase.

The present invention relates to a process of eluting phosphorus out of sludge, which comprises crushing cell walls of microorganisms in sludge by heating the sludge and then treating the resultant sludge with alkali, thereby eluting phosphorus out of sludge into a liquid phase.

The present invention relates to a process of recovering phosphorus, which comprises eluting phosphorus out of sludge into a liquid phase by each of the foregoing methods of eluting phosphorus and then precipitating with a coagulant, thereby recovering the resultant phosphorus.

The present invention relates to a process of producing a material containing phosphorus, which comprises eluting phosphorus out of sludge into a liquid phase by the each foregoing method of eluting phosphorus and then precipitating with a coagulant, thereby recovering the resultant phosphorus.

BRIEF DESCRIPTION OF THE DRAWINGS

FIG. 8 is a graph showing the relation between pHs during treating with alkali and the concentrations of polyphosphoric acid in a liquid phase in Examples 10 to 18 and Comparative Examples 7 to 13.

FIG. 9 is a graph showing the changes of the concentrations of phosphorus in a liquid phase corresponding to time in the conventional techniques.

DETAILED DESCRIPTION

Figure 1:
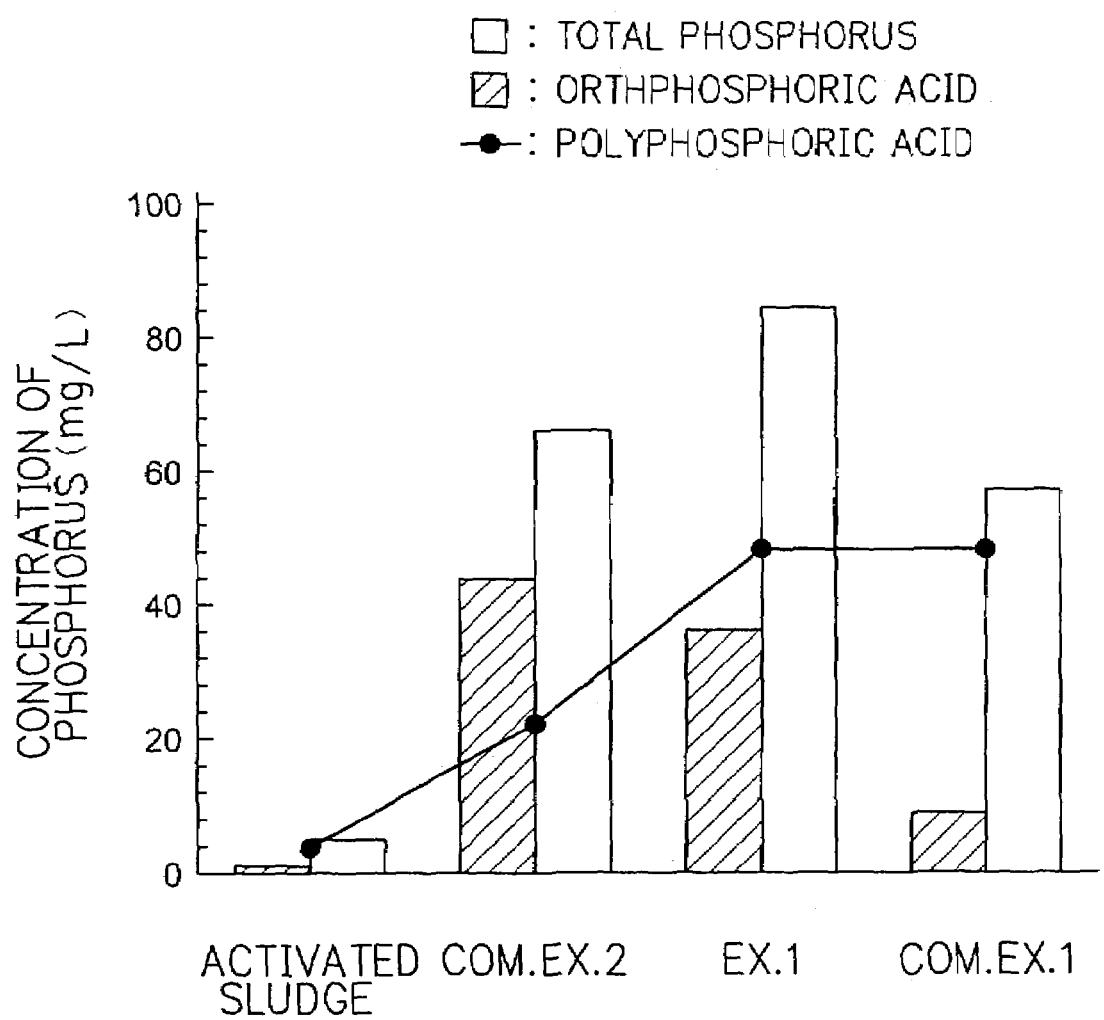
FIG. 1 is a graph showing the concentrations of phosphorus in a liquid phase in Example 1, Comparative Examples 1 and 2.

In the present invention, sludge is pre-treated and then treated with alkali. Phosphorus can be eluted out of sludge into a liquid phase by treating sludge containing phosphorus with alkali. An example of sludge containing phosphorus is sludge containing microorganisms, to be concrete, activated sludge utilized in a sewage disposal. An example of phosphorus in sludge is phosphorus which microorganisms in sludge have in their bodies. Phosphorus eluted into a liquid phase by treating with alkali are soluble, and an example of the soluble phosphorus is phosphoric acid. Phosphoric acid includes orthophosphoric acid and polyphosphoric acid from dehydration condensation of orthophosphoric acids. Examples of polyphosphoric acid are diphosphoric acid, triphosphoric acid and tetraphosphoric acid corresponding to the number of the orthophosphoric acids involved in dehydration condensation. Because polyphosphoric acid relatively easily coagulates with a coagulant and is consequently recovered from a liquid phase, eluting polyphosphoric acid into a liquid phase is effective for an efficient recovery of phosphorus out of sludge and then recycling them into resources.

For example, treatment of sludge with alkali can be made by adding alkali to sludge. Examples of alkali which can be used are metal hydroxides, to be concrete, sodium hydroxide, potassium hydroxide, lithium hydroxide and the like. Alkali can be added, for example, in a solution form. For example, phosphorus is eluted efficiently out of sludge into a liquid phase by adding an alkali solution which has concentration of 0.2 to 3 N, preferably of 0.5 to 2 N.

When sludge is treated with alkali, phosphorus is eluted efficiently out of sludge into a liquid phase by adjusting pH of a liquid phase to at least 8, preferably at least 9, more preferably at least 10, further preferably 11 and specifically preferable at least 12. In the case pH of a liquid phase is lower, phosphorus is not likely to be fully eluted out of sludge.

In the present invention, sludge is treated with at least one pre-treatment selected from the group consisting of crushing, treatment with ozone and treatment with heat, and then the resultant sludge is treated with alkali. By treating with the foregoing pre-treatments, for example, cell walls of microorganisms in sludge can be crushed. When cell walls of microorganisms in sludge is crushed, by treating the resultant sludge with alkali, phosphorus which microorganisms have in their bodies can be eluted into a liquid phase efficiently in a shorter time.

Firstly, sludge can be crushed by an ultrasonic wave treatment with an ultrasonic homogenizer. Cell walls of microorganisms in sludge can be fully crushed by an ultrasonic wave treatment, for example, for 5 minutes to 120 minutes, preferably for 10 minutes to 60 minutes. In the case time length of an ultrasonic wave treatment is shorter, cell walls of microorganisms in sludge are not likely to be fully crushed. In the case time length of an ultrasonic wave treatment is longer, energy for the treatment is likely to be larger, though cell walls of microorganisms in sludge can be fully crushed.

Sludge and also cell walls of microorganisms in the sludge can be crushed, for example, by giving mechanical force with such as a roller, a Hughes press and the like, by dispersing sludge by the decompression method or by stirring sludge with Waring blender or the like.

Secondly, cell walls of microorganisms in sludge can be crushed by treating with ozone. For example, ozone treatment can be made by contacting sludge in with ozone gas. Sludge can be contacted with ozone, for example, by injecting ozone into sludge. Ozone gas can be injected, for example, with a diffuser-type reactor, an ejector-type of reactor or the like.

Cell walls of microorganisms in sludge can be fully crushed by injecting ozone-containing gas, wherein the concentration of ozone is, for example, 5 to 300 g/m$^3$, preferably 5 to 100 g/m$^3$ and more preferably 10 to 50 g/m$^3$ and the rate of injecting gas is, for example, at least 0.2 L/min and preferably 0.5 to 2 L/min and gas injecting time is, for example, 1 to 60 minutes and preferably 5 to 30 minutes, respectively per 1 L of sludge. In the case the concentration of ozone in ozone-containing gas is lower, cell walls of microorganisms in sludge are not likely to be fully crushed. In the case the concentration of ozone in ozone-containing gas is higher, energy for a treatment is likely to be larger, though cell walls of microorganisms in sludge can be fully crushed. In the case gas injecting time is shorter, cell walls of microorganisms in sludge are not likely to be fully crushed. In the case gas injecting time is longer, energy for a treatment is likely to be larger, though cell walls of microorganisms in sludge can be fully crushed.

Thirdly, cell walls of microorganisms in sludge can be crushed by raising temperature of sludge with heat. Temperature of sludge can be raised by heating with a heater, a boiler, a heat pump or the like. Sludge can be heated, for example, by putting a heater equipped with a water-jacket into sludge.

Cell walls of microorganisms in sludge can be fully crushed by heating sludge, wherein the heating temperature is, for example, 50 to 90° C. and preferably 60 to 80° C. and heating time is, for example, 10 to 120 minutes and preferably 20 to 60 minutes. In the case the heating temperature is lower, cell walls of microorganisms in sludge are not likely to be fully crushed. In the case the heating temperature is higher, energy for a treatment is likely to be larger, though cell walls of microorganisms in sludge can be fully crushed. In the case the heating time is shorter, cell walls of microorganisms in sludge are not likely to be fully crushed. In the case the heating time is longer, energy for a treatment is likely to be larger, though cell walls of microorganisms in sludge can be fully crushed.

In the process of recovering phosphorus of the present invention, phosphorus is eluted out of sludge into a liquid phase and then recovered from the liquid phase. Phosphorus is eluted out of sludge into a liquid phase and the liquid phase is recovered from sludge by solid-liquid separation, thereby phosphorus can be recovered by coagulation and precipitation. A liquid phase can be separated and then recovered from sludge, for example, by sedimentation or by membrane separation. Phosphorus in the liquid phase recovered can be coagulated and then precipitated by adding a coagulant. Examples of the coagulant which can be used are calcium chloride, calcium hydroxide, calcium oxide, ferric chloride, aluminium sulfate, polyacrylamide (PAC), polymer coagulant, zirconium oxide, magnesium and the like. For example, when a coagulant of metal compounds is used, phosphorus in a liquid phase can be fully coagulated and precipitated by adding the coagulant which contains 0.5 to 10 mol and preferably 1 to 5 mol of metal atoms such as calcium, iron, aluminium and the like per 1 mol of phosphorus. Phosphorus which is coagulated and precipitated can be recovered, for example, by sedimentation or by membrane separation. According to the present invention, phosphorus can be recovered as a material containing phosphorus such as calcium phosphate, aluminium phosphate, magnesium ammonium phosphate and the like.

EXAMPLES 1 TO 3, COMPARATIVE EXAMPLES 1 AND 2

Activated sludge was taken from a certain sewage disposal plant and the concentration of grains which had diameters of 1 μm or more (the SS concentration) was adjusted to about 2000 mg/L. Activated sludge, wherein microorganisms had been made to take phosphorus in their bodies by aerating for a day and a night, was used as a sample for the experiments. The sum of the concentrations of total phosphorus in activated sludge was 100 mg/L. The sum of the concentration of total phosphorus in a liquid phase per 1 L of activated sludge was 5 mg/L, the concentration of orthophosphoric acid was 1 mg/L and the concentration of polyphosphoric acid was 4 mg/L.

400 mL of activated sludge was put into a 500 mL beaker and then crushed by an ultrasonic wave treatment with an ultrasonic homogenizer for thirty minutes. The beaker was equipped with a water-jacket, adjusting temperature of sludge so as not to rise with heat produced by an ultrasonic treatment. After an ultrasonic treatment, 1 N of sodium hydroxide solution (alkali) was added, adjusting pH of a liquid phase to 12, and then the sum of the concentration of total phosphorus and the concentration of orthophosphoric acid in a liquid phase per 1 L of sludge were measured and then the concentration of polyphosphoric acid was calculated (Example 1).

Total phosphorus was decomposed with potassium peroxodisulfate and then the concentration of total phosphorus in a liquid phase per 1 L of activated sludge was measured using molybdenum blue absoptiometry by ascorbic acid reduction. The concentration of orthophosphoric acid in a liquid phase was measured using ion chromatography. The concentration of polyphosphoric acid was calculated by subtracting the concentration of orthphosphoric acid from the sum of the concentration of total phosphorus. The results are shown in FIG. 1.

The sum of the concentration of total phosphorus in a liquid phase per 1 L of activated sludge was about 66 mg/L in Comparative Example 2, wherein sludge was treated with an ultrasonic wave homogenizer and alkali was not added, 84 mg/L in Example 1, wherein sludge was treated with an ultrasonic wave homogenizer and then alkali was added to the resultant sludge, and 57 mg/L in Comparative Example 1 wherein alkali was added to sludge without treating with an ultrasonic wave homogenizer.

The concentration of polyphosphoric acid in a liquid phase per 1 L of activated sludge was 22 mg/L in Comparative Example 2, wherein sludge was treated with an ultrasonic wave homogenizer and alkali was not added and 48 mg/L both in Example 1, wherein sludge was treated with an ultrasonic wave homogenizer and then alkali was added to the resultant sludge and in Comparative Example 1, wherein alkali was added without treating with an ultrasonic homogenizer.

That is to say, in Example 1, wherein activated sludge was treated with an ultrasonic wave homogenizer and then alkali was added to the resultant sludge, 84% of total phosphorus in activated sludge were eluted into a liquid phase and 57% of the phosphorus eluted into a liquid phase were polyphosphoric acid.

Figure 2:
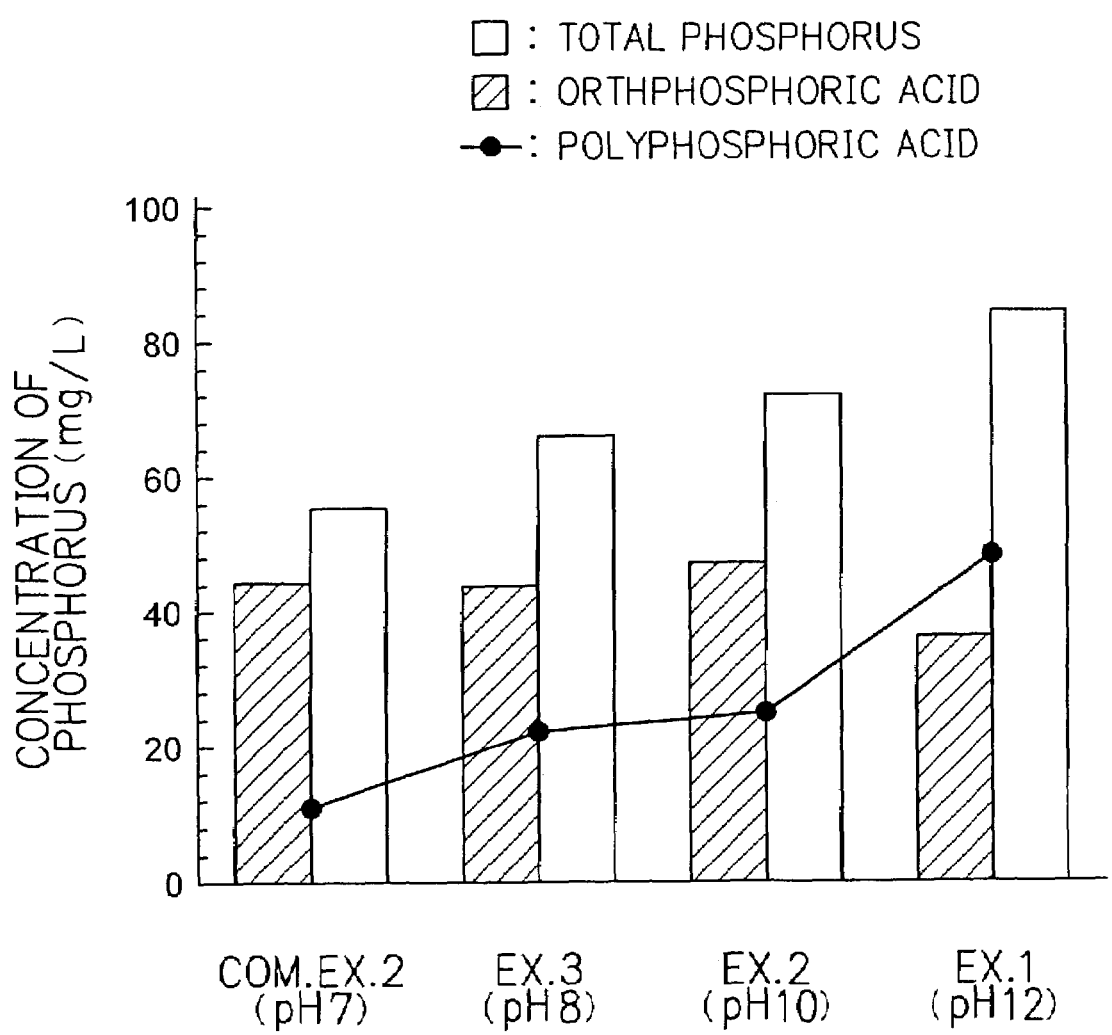
FIG. 2 is a graph showing the concentrations of phosphorus (influences of pH) in a liquid phase in Examples 1 to 3 and Comparative Example 2.

Next, the results of Example 1, wherein activated sludge was treated with an ultrasonic wave homogenizer and then alkali was added to the resultant sludge, adjusting pH of a liquid phase to 12, Example 2, wherein pH of a liquid phase was adjusted to 10 and Example 3 wherein pH of a liquid phase was adjusted to 8 are shown in FIG. 2. In Comparative Example 2, wherein sludge was treated with an ultrasonic wave homogenizer and alkali was not added, pH of a liquid phase was 7. In Example 2, wherein pH of a liquid phase was adjusted to 10, the sum of the concentration of total phosphorus in the liquid phase per 1 L of activated sludge was 72 mg/L and the concentration of polyphosphoric acid was 25 mg/L. In Example 3, wherein pH of a liquid phase was adjusted to 8, the sum of the concentration of total phosphorus in the liquid phase was 67 mg/L and the concentration of polyphosphoric acid was 22 mg/L.

FIG. 2 indicates that the amount of the phosphorus eluted into a liquid phase increased as pH becomes higher after treating with an ultrasonic wave homogenizer. That is, phosphorus was fully eluted out of activated sludge into a liquid phase by adjusting pH of a liquid phase with alkali to at least 8, furthermore at least 10 and specifically at least 12 after an ultrasonic wave treatment.

Phosphorus was eluted out of activated sludge into a liquid phase and then the resultant liquid phase was recovered by membrane separation. Calcium chloride containing 0.2 g of calcium per 1 g of phosphorus was added to the liquid phase recovered and phosphorus in the resultant liquid phase were coagulated and precipitated, thereby were recovered by sedimentation. 45 g of phosphorus in Example 1, 22 g of phosphorus in Example 2 and 18 g of phosphorus in Example 3 were recovered respectively per 1 L of activated sludge.

In Examples 1 to 3, activated sludge was crushed with an ultrasonic wave homogenizer and in the case activated sludge was crushed with a roller, a Hughes press, the decompression method, Waring blender and the like, the effects are equal to Examples 1 to 3 or more.

In Examples 1 to 3, by raising pH of a liquid phase with alkali, that is, making a liquid phase alkalized, after an ultrasonic wave treatment, phosphorus was eluted out of activated sludge into a liquid phase effectively in a shorter time. Also, in Examples 1 to 3, because 50% or more of the phosphorus eluted into a liquid phase were polyphosphoric acid, which relatively easily coagulates and precipitates with a small amount of a coagulant, the amount of the coagulant required for recovering phosphorus in a liquid phase was reduced and phosphorus was recovered efficiently. Furthermore, in Examples 1 to 3, because the liquid phase wherein phosphorus had been eluted was alkalized, phosphorus was easily coagulated and precipitated and then recovered effectively with calcium chloride.

EXAMPLES 4 TO 6, COMPARATIVE EXAMPLES 3 AND 4

In the same way as Example 1, activated sludge was taken from a certain sewage disposal plant and the SS concentration of sludge was adjusted to about 2000 mg/L. Activated sludge, wherein microorganisms had been made to take phosphorus in their bodies by aerating for a day and a night, was used as a sample for the experiments. The sum of the concentration of total phosphorus in activated sludge, measured and calculated in the same way as Example 1, was 80 mg/L. The sum of the concentration of total phosphorus in the liquid phase per 1 L of activated sludge was 12 mg/L, the concentration of orthphosphoric acid was 11 mg/L and the concentration of polyphosphoric acid was 1 mg/L.

Figure 3:
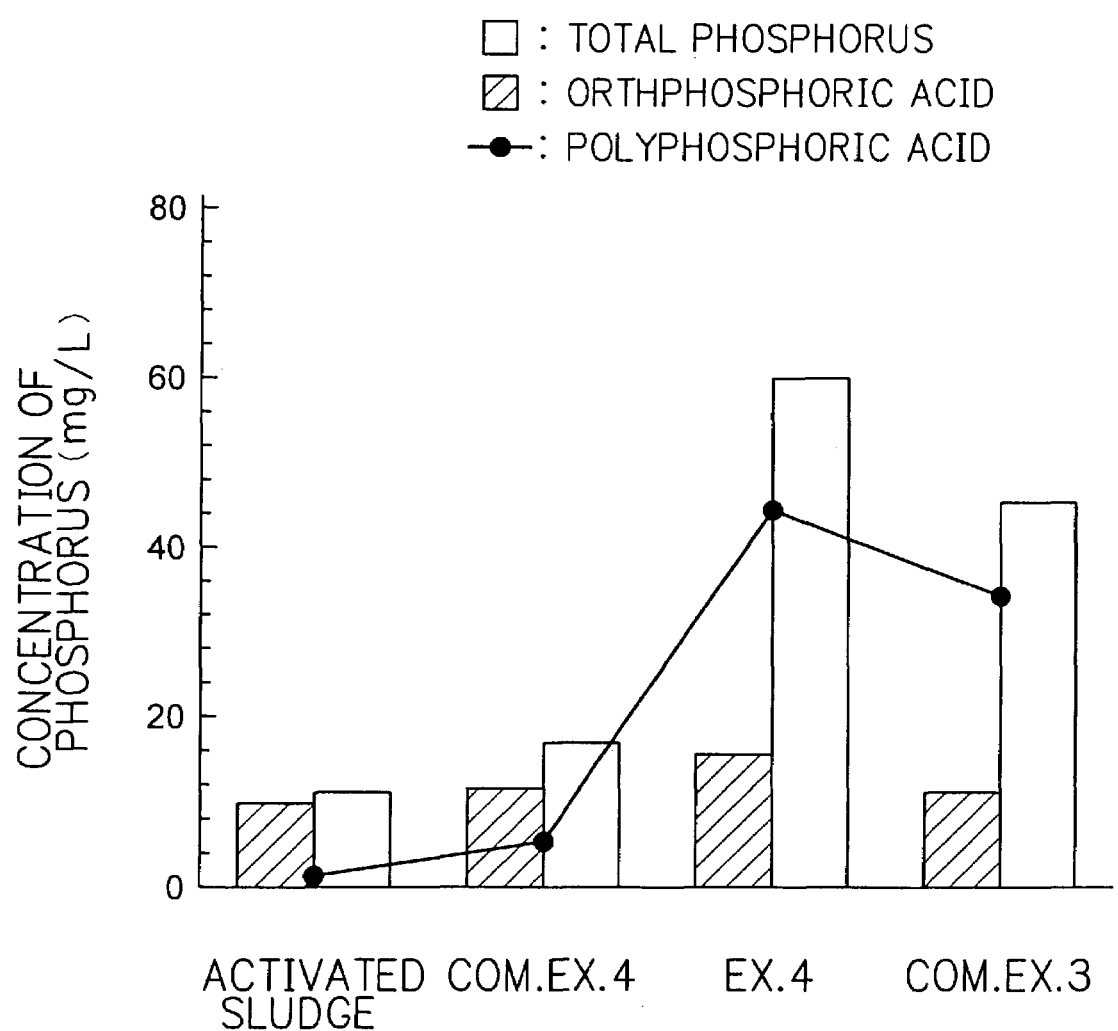
FIG. 3 is a graph showing the concentrations of phosphorus in a liquid phase in Example 4, Comparative Examples 3 and 4.

400 mg of activated sludge was put into 1 L diffuser-type reactor and then crushed by ozone treatment of injecting ozone-containing gas, wherein the concentration of ozone was 20 g/m$^3$, the rate of injecting gas was 0.4 L/min, and gas injecting time was 10 minutes. After treating sludge with ozone, 1 N of sodium hydroxide solution (alkali) was added to the resultant sludge, adjusting pH of a liquid phase to 12. The sum of the concentration of total phosphorus and the concentration of orthophosphoric acid in a liquid phase per 1 L of activated sludge were measured and then the concentration of polyphosphoric acid was calculated (Example 4). The results are shown in FIG. 3.

The sum of the concentration of total phosphorus in the liquid phase per 1 L of activated sludge was about 16 mg/L in Comparative Example 4, wherein activated sludge was treated with ozone and alkali was not added, 60 mg/L in Example 4, wherein activated sludge was treated with ozone and then alkali was added, and 45 mg/L in Comparative Example 3, wherein alkali was added without treating with ozone.

The concentration of polyphosphoric acid in a liquid phase per 1 L of activated sludge was 5 mg/L in Comparative Example 4, wherein activated sludge was treated with ozone and alkali was not added, 44 mg/L in Example 4, wherein activated sludge was treated with ozone and then alkali was added, and 34 mg/L in Comparative Example 3, wherein alkali was added without treating with ozone.

That is to say, 75% of total phosphorus in activated sludge was eluted into a liquid phase and 73% of the total phosphorus eluted into the liquid phase was polyphosphoric acid in Example 4, wherein activated sludge was treated with ozone and then alkali was added.

Figure 4:
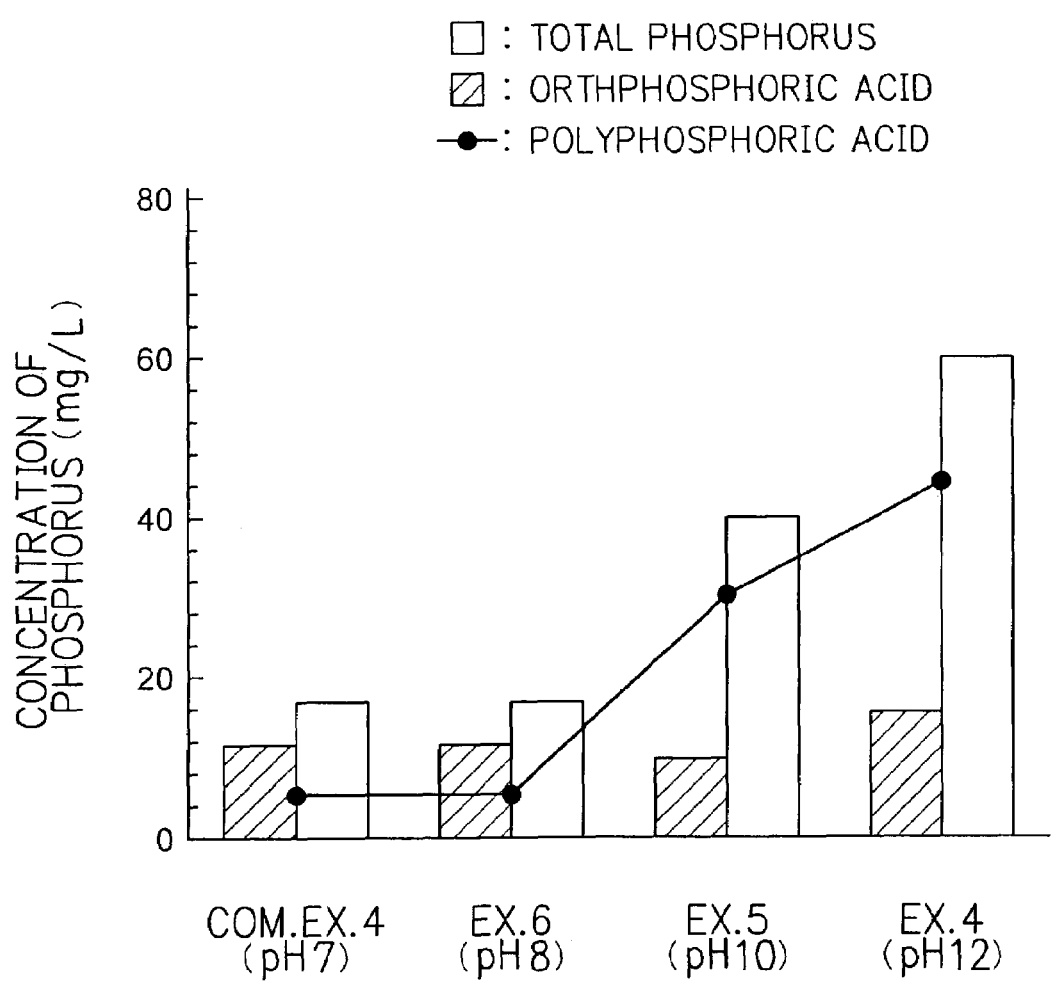
FIG. 4 is a graph showing the concentrations of phosphorus (influences of pH) in a liquid phase in Examples 4 to 6 and Comparative Example 4.

Next, the results of Example 4, wherein activated sludge was treated with ozone and then alkali was added, adjusting pH of a liquid phase to 12, Example 5, wherein pH of a liquid phase was adjusted to 10, and Example 6, wherein pH of a liquid phase was adjusted to 8, are shown in FIG. 4. A liquid phase had pH of 7 in Comparative Example 4, wherein activated sludge was treated with ozone and alkali was not added. The sum of the concentration of total phosphorus in the liquid phase per 1 L of activated sludge was 41 mg/L and the concentration of polyphosphoric acid was 30 mg/L in Example 5, wherein pH of a liquid phase was adjusted to 10. The sum of the concentration of total phosphorus in a liquid phase per 1 L of activated sludge was 17 mg/L and the concentration of polyphosphoric acid was 6 mg/L in Example 6, wherein pH of a liquid phase was adjusted to 8.

FIG. 4 shows that the amount of phosphorus eluted into a liquid phase increased as pH becomes higher after treating with ozone. That is, phosphorus was fully eluted out of activated sludge into a liquid phase by adjusting pH of the liquid to at least 8, furthermore at least 10 and specifically at least 12 with alkali after treatment with ozone.

Phosphorus was eluted out of activated sludge into a liquid phase and then the resultant liquid phase was recovered by sedimentation. The phosphorus was coagulated and precipitated by adding calcium chloride containing 0.2 g of Ca per 1 g of phosphorus to the liquid phase recovered and then the phosphorus which had been coagulated and precipitated were recovered by sedimentation. 40 g of phosphorus per 1 L of activated sludge in Example 4, 27 g of phosphorus in Example 5 and 3 g of phosphorus in Example 6 were recovered.

In Examples 4 to 6, activated sludge was treated with ozone using diffuser-type reactor and in the case activated sludge was treated with ozone using ejector type reactor or the like, the effects are equal to Examples 4 to 6 or more.

In Examples 4 to 6, by raising pH of a liquid phase with alkali, that is, making a liquid phase alkalized, after treating with ozone, phosphorus was eluted out of activated sludge into a liquid phase effectively in a shorter time. Also, in Examples 4 to 6, because 70% or more of phosphorus eluted into a liquid phase were polyphosphoric acid, which relatively easily coagulates and precipitates with a small amount of a coagulant, the amount of the coagulant required for recovering phosphorus in a liquid phase was reduced and phosphorus was recovered efficiently. Furthermore, in Examples 4 to 6, because the liquid phase wherein phosphorus had been eluted was alkalized, phosphorus was easily coagulated and precipitated and then recovered effectively with calcium chloride.

EXAMPLES 7 TO 9, COMPARATIVE EXAMPLES 5 AND 6

In the same way as Example 1, activated sludge was taken from a certain sewage disposal plant and the SS concentration of the sludge was adjusted to about 2000 mg/L. Activated sludge, wherein microorganisms had been made to take phosphorus in their bodies by aerating for a day and a night, was used as a sample for the experiments. The sum of the concentration of total phosphorus in activated sludge, measured and calculated in the same way as Example 1, was 80 mg/L. The sum of the concentration of total phosphorus in a liquid phase per 1 L of activated sludge was 6 mg/L, the concentration of orthphosphoric acid was 5 mg/L and the concentration of polyphosphoric acid was 1 mg/L.

Figure 5:
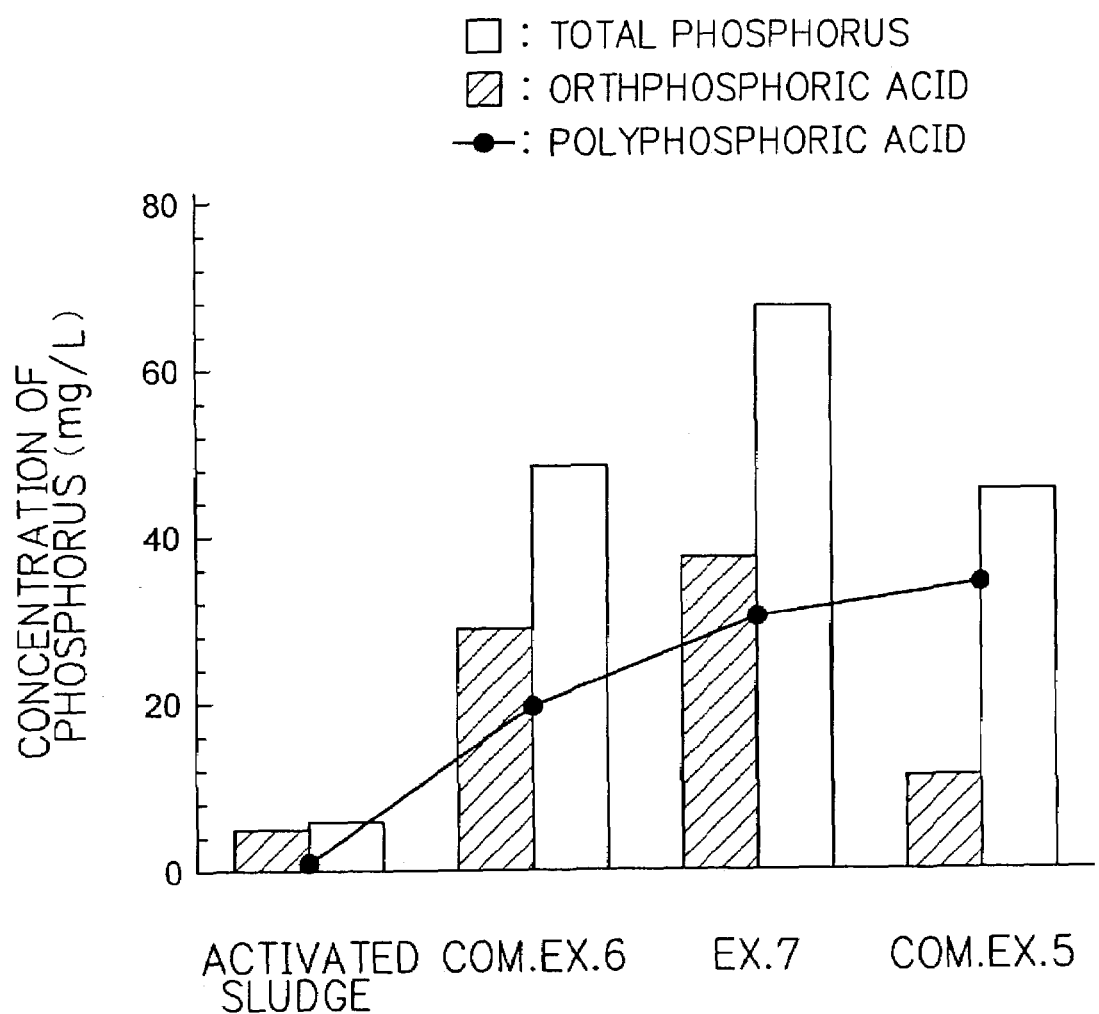
FIG. 5 is a graph showing the concentrations of phosphorus in a liquid phase in Example 7, Comparative Examples 5 and 6.

400 mL of activated sludge was put into a 500 mL beaker and a heater equipped with a water-jacket was put into the beaker, thereby treated with heat at 70° C. for 30 minutes. After the treatment with heat, 1 N of sodium hydroxide was added to activated sludge, adjusting pH of a liquid phase to 12. The sum of the concentration of total phosphorus and the concentration of orthophosphoric acid in a liquid phase per 1 L of activated sludge was measured and then the concentration of polyphosphoric acid was calculated (Example 7). The results are shown in FIG. 5.

The sum of the concentration of total phosphorus in a liquid phase per 1 L of activated sludge was about 48 mg/L in Comparative Example 6, wherein activated sludge was treated with heat and alkali was not added, 67 mg/L in Example 7, wherein activated sludge was treated with heat and then alkali was added, and 45 mg/L in Comparative example 5, wherein alkali was added without treatment with heat.

The concentration of polyphosphoric acid in a liquid phase per 1 L of activated sludge was 19 mg/L in Comparative Example 6, wherein activated sludge was treated with heat and alkali was not added, 30 mg/L in Example 7, wherein activated sludge was treated with heat and then alkali was added and 34 mg/L in Comparative Example 5, wherein alkali was added without treatment with heat.

That is to say, 84% of total phosphorus in activated sludge was eluted into a liquid phase and 45% of the total phosphorus eluted into the liquid phase was polyphosphoric acid in Example 7, wherein activated sludge was treated with heat and then alkali was added.

Figure 6:
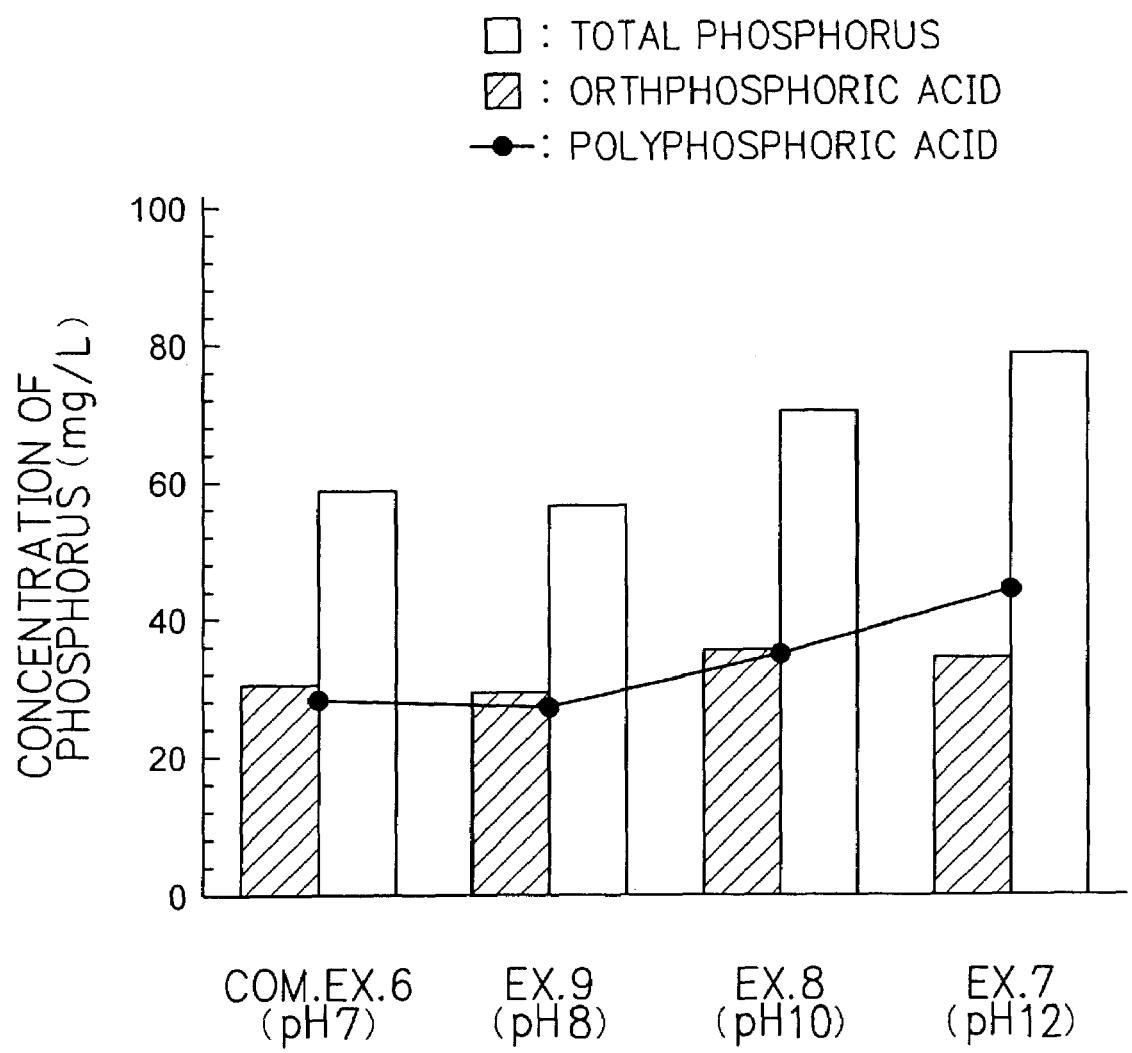
FIG. 6 is a graph showing the concentrations of phosphorus (influences of pH) in a liquid phase in Examples 7 to 9 and Comparative Example 6.

Next, the results of Example 7, wherein activated sludge was treated with heat and then treated with alkali, adjusting pH of a liquid phase to 12, Example 8, wherein pH of a liquid phase was adjusted to 10, and Example 9, wherein pH of a liquid phase was adjusted to 8, are shown in FIG. 6. A liquid phase had pH of 7 in Comparative Example 6, wherein activated sludge was treated with heat and alkali was not added. The sum of the concentration of total phosphorus in a liquid phase per 1 L of activated sludge was 71 mg/L and the concentration of polyphosphoric acid was 35 mg/L in Example 8, wherein pH of a liquid phase was adjusted to 10. The sum of the concentration of total phosphorus in a liquid phase per 1 L of activated sludge was 57 mg/L and the concentration of polyphosphoric acid was 27 mg/L in Example 9, wherein pH of a liquid phase was adjusted to 8.

FIG. 6 shows that the amount of phosphorus eluted into a liquid phase increased as pH becomes higher after treatment with heat. That is, phosphorus was fully eluted out of activated sludge into a liquid phase by adjusting pH of a liquid to at least 8, furthermore at least 10 and specifically at least 12 with alkali after treatment with heat.

Phosphorus was eluted out of activated sludge into a liquid phase and then the resultant liquid phase was recovered by sedimentation. Phosphorus was coagulated and precipitated by adding calcium chloride containing 1 g of Ca per 1 g of phosphorus to the liquid phase recovered and then the phosphorus which had been coagulated and precipitated were recovered by sedimentation. 38 g of phosphorus in Example 7, 28 g of phosphorus in Example 8 and 25 g of phosphorus in Example 9 were recovered respectively per 1 L of activated sludge.

In Examples 7 to 9, activated sludge was treated with heat using a heater and in the case activated sludge was treated with heat using a boiler, a heat pump and the like, the effects are equal to Examples 7 to 9 or more.

In Examples 7 to 9, by raising pH of a liquid phase with alkali, that is, making a liquid phase alkalized, after treating activated sludge with heat, phosphorus was eluted out of activated sludge into a liquid phase effectively in a shorter time. Also, in Examples 7 to 9, because 40% or more of phosphorus eluted into a liquid phase was polyphosphoric acid, which relatively easily coagulates and precipitates with a small amount of a coagulant, the amount of the coagulant required for recovering phosphorus in a liquid phase was reduced and phosphorus was recovered efficiently. Furthermore, in Examples 7 to 9, because the liquid phase wherein phosphorus had been eluted was alkalized, phosphorus was easily coagulated and precipitated and then recovered effectively with calcium chloride.

EXAMPLES 10 TO 18 AND COMPARATIVE EXAMPLES 7 to 13

The concentration of polyphosphoric acid in a liquid phase per 1 L of activated sludge was calculated in the same way as Example 4 except that activated sludge which contains 86 mg/L of total phosphorus was used as a sample and that injecting time of ozone-containing gas (ozone injecting time) was controlled to vary the amount of ozone injected per 1 L of activated sludge and that activated sludge was treated with alkali adjusting pH of a liquid phase to 10, 11 or 12. Temperature of activated sludge during each treatment was 21° C. Ozone injecting time, an amount of ozone injected and pH after treatment with alkali in each Example and each Comparative example are shown in Table 1. Treatment with ozone was not made in Comparative examples 7 to 9 and 13. And treatment with alkali was not made in Comparative Examples 10 to 13.

TABLE 1

|  | ozone injecting time (minute) | amount of injected ozone (mg/L) | alkali treatment (pH) |
|---|---|---|---|
| Ex. 10 | 5 | 226 | 12 |
| Ex. 11 | 3 | 136 | 12 |
| Ex. 12 | 1 | 45 | 12 |
| Ex. 13 | 5 | 226 | 11 |
| Ex. 14 | 3 | 136 | 11 |
| Ex. 15 | 1 | 45 | 11 |
| Ex. 16 | 5 | 226 | 10 |
| Ex. 17 | 3 | 136 | 10 |
| Ex. 18 | 1 | 45 | 10 |
| Com. Ex. 7 | 0 | 0 | 12 |
| Com. Ex. 8 | 0 | 0 | 11 |
| Com. Ex. 9 | 0 | 0 | 10 |
| Com. Ex. 10 | 5 | 226 | 7 |
| Com. Ex. 11 | 3 | 136 | 7 |
| Com. Ex. 12 | 1 | 45 | 7 |
| Com. Ex. 13 | 0 | 0 | 7 |

Figure 7:
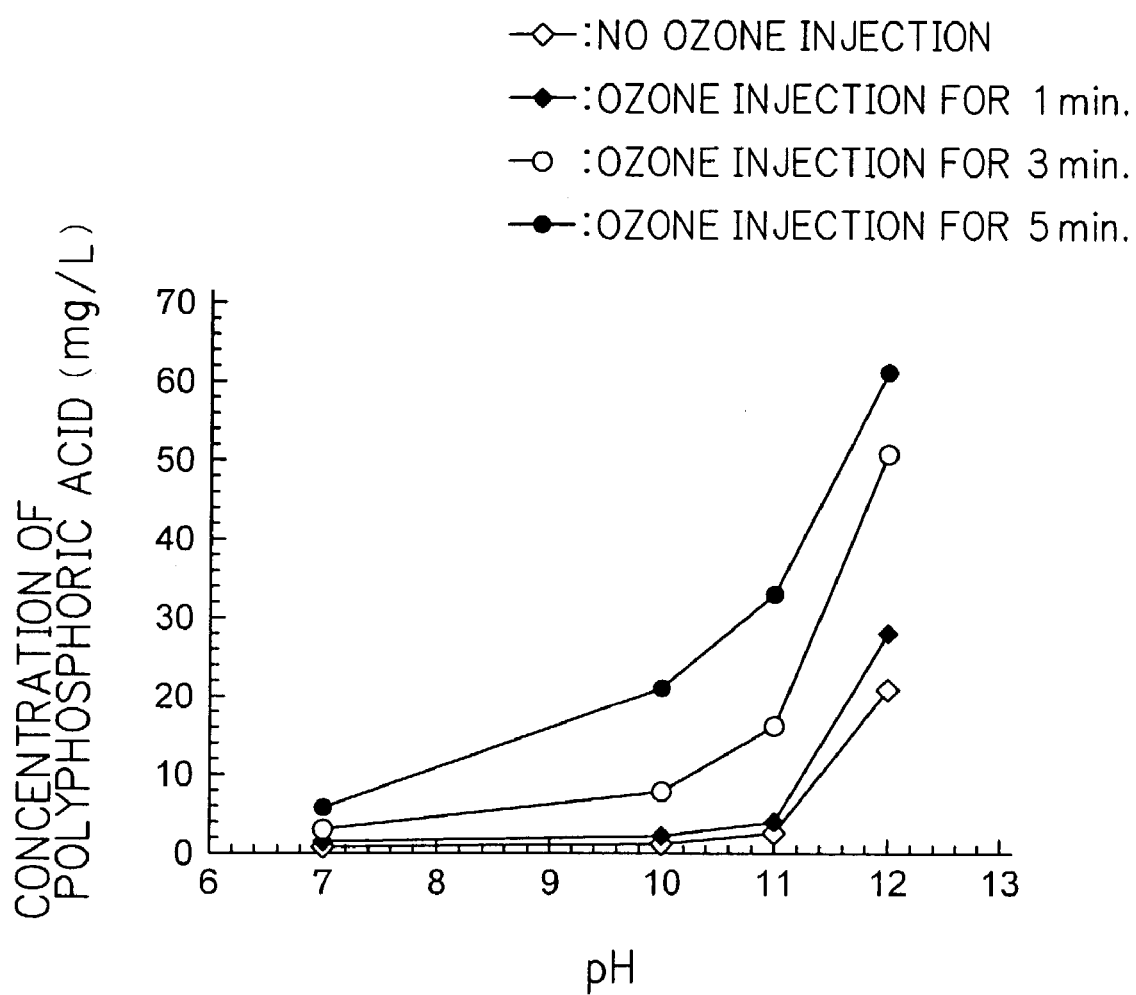
FIG. 7 is a graph showing the relation between the amounts of ozone injected and the concentrations of polyphosphoric acid in a liquid phase in Examples 10 to 18 and Comparative Examples 7 to 13.

As a result, the relation between amounts of ozone injected and concentrations of polyphosphoric acid in a liquid phase is shown in FIG. 7. And the relation between pHs during treating with alkali and concentrations of polyphosphoric acid in a liquid phase is shown in FIG. 8.

FIG. 7 shows that an amount of eluted polyphosphoric acid increases as an amount of injected ozone becomes larger. It also shows that an amount of polyphosphoric acid eluted increases as pH during a treatment with alkali becomes higher. For example, in Example 10, wherein the amount of ozone injected was 226 mg/L (ozone injecting time was 5 minutes) and pH during a treatment with alkali was 12, the amount of polyphosphoric acid eluted was 61 mg/L, which means 71% of total polyphosphoric acid contained in the active sludge was eluted.

FIG. 8 shows that an amount of polyphosphoric acid eluted increases as pH during a treatment with alkali becomes higher and that such a tendency was remarkable when pH was 11 or more. And the amount of polyphosphoric acid eluted was 21 mg/L in Comparative Example 7, wherein a treatment with ozone was not made and pH during a treatment with alkali was 12, and the amount of polyphosphoric acid eluted was 6 mg/L in Comparative Example 10, wherein the amount of ozone injected was 226 mg/L (ozone injecting time was 5 minutes) and a treatment with alkali was not made. By contrast, the amount of polyphosphoric acid eluted was 61 mg/L in Example 10, wherein the amount of ozone injected was 226 mg/L (ozone injecting time was 5 minutes) and pH during a treatment with alkali was 12. The result shows that more polyphosphoric acid can be eluted both by a treatment with ozone and a treatment with alkali.

In the present Examples, treating time with alkali was about 5 minutes and consequently 70% or more of phosphorus in activated sludge were eluted for about 10 minutes of phosphorus eluting time (the sum of ozone treating time and alkali treating time). It is much faster than the treating time of the conventional process of eluting phosphorus by heating sludge (one hour).

INDUSTRIAL APPLICABILITY

According to the present invention, phosphorus can be eluted out of sludge into a liquid phase effectively in a shorter time by crushing sludge and then treating the resultant sludge with alkali.

According to the present invention, phosphorus can be eluted out of sludge into a liquid phase effectively in a shorter time by treating sludge with ozone and then treating the resultant sludge with alkali.

According to the present invention, phosphorus can be eluted out of sludge into a liquid phase effectively in a shorter time by heating sludge and then treating the resultant sludge with alkali.

According to the present invention, phosphorus can be eluted out of sludge into a liquid phase effectively in a shorter time by crushing cell walls of microorganisms in sludge and then treating the resultant sludge with alkali.

According to the process of recovering phosphorus in the present invention, phosphorus is eluted out of sludge into a liquid phase effectively in a shorter time and consequently are recovered quickly and efficiently.

According to the process of producing a material containing phosphorus in the present invention, phosphorus can be quickly recovered out of sludge as a material containing phosphorus and then recycled into resources.

What is claimed is:

1. A process of eluting phosphorus from sludge, comprising rupturing cell walls of microorganisms in sludge by treating the sludge with ozone and successively treating the sludge with alkali, to elute phosphorus from the sludge into a liquid phase.

2. A process of recovering phosphorus, comprising eluting phosphorus from sludge into a liquid phase by the process of claim 1 and subsequently precipitating the phosphorus from the liquid phase with a coagulant, thereby recovering the phosphorus.

3. A process of producing a material containing phosphorus, comprising, eluting phosphorus from sludge into a liquid phase by the process of claim 1 and subsequently precipitating the phosphorus from the liquid phase with a coagulant, thereby recovering the phosphorus, wherein the material containing phosphorus is calcium phosphate, aluminum phosphate or magnesium ammonium phosphate.

* * * * *